United States Patent [19]

Mansvelt et al.

[11] Patent Number: 5,175,416
[45] Date of Patent: Dec. 29, 1992

[54] FUNDS TRANSFER SYSTEM

[76] Inventors: Andre P. Mansvelt, 171 ANderson Avenue, Northcliff, Johannesburg, Transvaal; Serge C. P. Belamant, 55 - 13th Street, Parkmore, Johannesburg, Transvaal, both of South Africa

[21] Appl. No.: 701,821

[22] Filed: May 17, 1991

[51] Int. Cl.⁵ .......................... G06F 15/30; G07F 7/10
[52] U.S. Cl. ...................................... 235/379; 235/380
[58] Field of Search .............................. 235/379, 380; 340/825.33

[56] References Cited

U.S. PATENT DOCUMENTS

| | | | |
|---|---|---|---|
| 4,277,837 | 7/1981 | Stuckert | 235/380 |
| 4,305,059 | 12/1981 | Benton | 340/825.33 |
| 4,454,414 | 6/1984 | Benton | 235/380 |
| 4,709,136 | 11/1987 | Watanabe | 235/379 |
| 4,926,325 | 5/1990 | Benton et al. | 340/825.33 |

FOREIGN PATENT DOCUMENTS 256768 2/1988 European Pat. Off. .

Primary Examiner—John W. Shepperd
Attorney, Agent, or Firm—Burns, Doane, Swecker & Mathis

[57] ABSTRACT

A method of transferring funds includes the steps of linking a first "smart card" to a first financial institution, debiting an account held at the financial institution and recording a corresponding credit value in the first smart card. The first smart card is then linked to a second, similar device, the credit value in the first device is reduced, and a corresponding credit value is recorded in the second device. The second device is then linked to a second financial institution, the credit value in the second device is reduced, and a corresponding credit value is recorded in an account held at the second financial institution. The first and second devices each store at least a portion of a program which is run in a synchronized interactive manner between the first devices. The invention extends to a system for implementing the method.

12 Claims, 7 Drawing Sheets

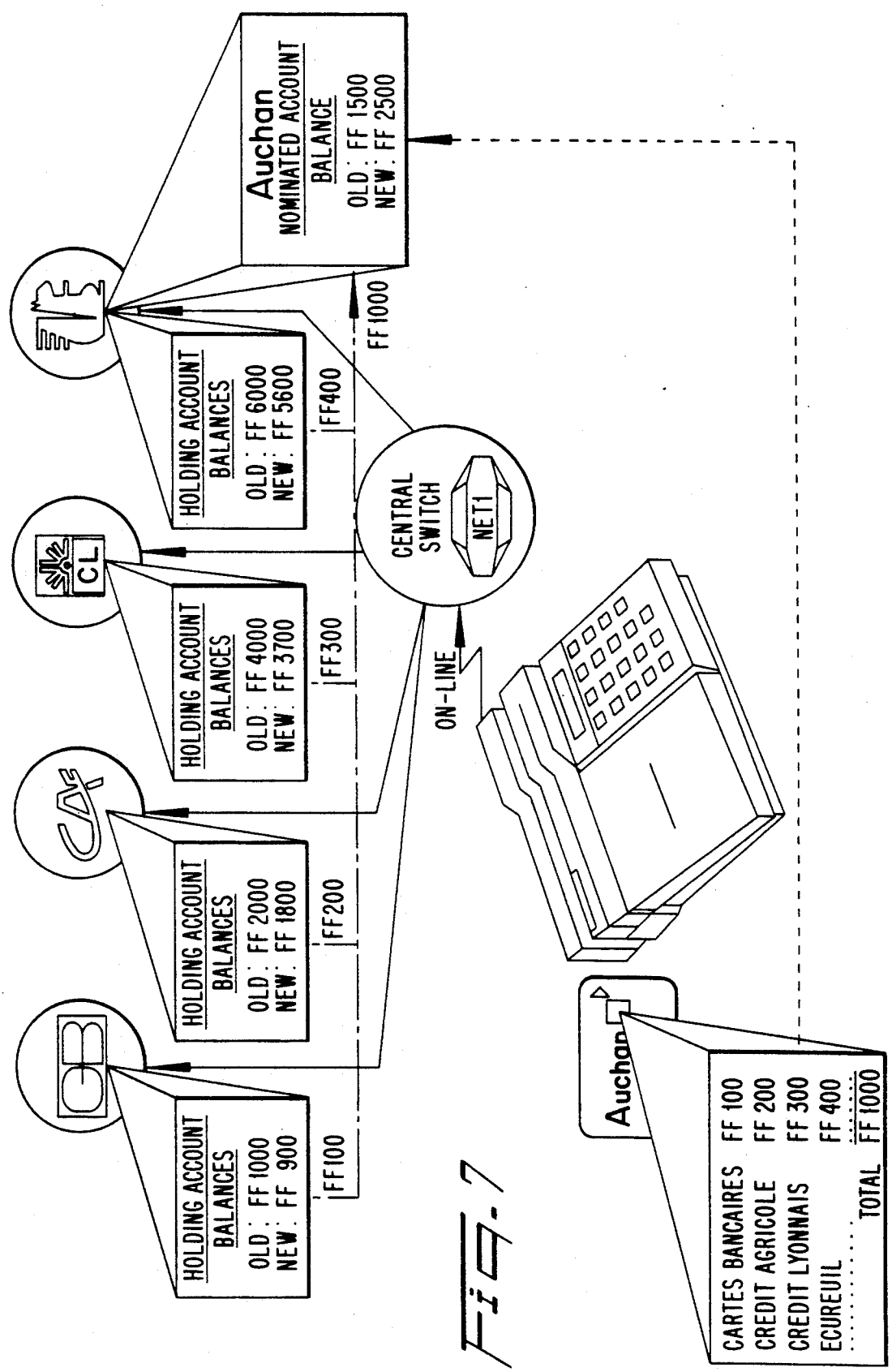

FUNDS TRANSFER SYSTEM

BACKGROUND OF THE INVENTION

This invention relates to a method of and a system for transferring funds.

At present, remote banking generally involves the use of magnetic stripe cards, together with cheques or cash. The cards are encoded with information identifying holders of the cards. The information stored on the card is typically a primary account number (PAN). Typically, the card is inserted into an automatic teller machine (ATM) and a personal identification number (PIN) is entered by the cardholder. In some cases, the ATM verifies that the entered PIN corresponds with a PIN calculated by the ATM and then allows a transaction such as a withdrawal or deposit of funds to take place. If the ATM is on-line to the relevant financial institution, the account of the cardholder may be debited immediately a withdrawal takes place, or the ATM may store the transaction information, with the cardholder's account being debited at a later stage, utilising track 3 on the card. In any event, direct debiting or crediting of an account is generally limited to a two way transaction between a financial institution and an account holder at the financial institution.

Cheques, credit cards, debit cards and cash are also utilised for the purchasing of goods and services. However, these systems are cumbersome and risky and, if provided as on-line services, are relatively unreliable and expensive.

SUMMARY OF THE INVENTION

According to the invention a method of transferring funds includes the steps of linking a first portable data storage and processing device to a first financial institution; debiting an account held at the financial institution and recording a corresponding credit value in the first portable data storage and processing device; linking the first portable data storage device to a second, similar device; reducing the credit value in the first device and recording a corresponding credit value in the second device; linking the second portable data storage and processing device to a second financial institution; reducing the credit value in the second device; and recording a corresponding credit value in an account held at the second financial institution.

Preferably, the first and second devices each store at least a portion of a program which is run in a synchronised interactive manner between the first and second devices.

A terminal means may be provided which receives the first and second devices and permits data transfer therebetween, the terminal means operating under the control of a stored program to facilitate interaction of the first and second devices.

The first and second financial institutions may be one and the same or different banks, building societies or other similar institutions.

The first and second portable data storage and processing devices are preferably "smart cards" comprising electronic data storage and processing circuitry on a credit card-like substrate, operating under the control of stored software.

The first device may be allocated to an individual registered at the first financial institution, while the second device may be allocated to a retailer or other commercial entity, the magnitude of the reduction in the credit value stored in the first device corresponding to the value of a transaction between the individual and the retailer or commercial entity.

The second device may total the credit values recorded therein, so that the credit value recorded at the second financial institution corresponds to the total of all credit values recorded in the second device in a predetermined period. Further according to the invention a system for transferring funds includes first and second portable data storage and processing devices; first terminal means for linking the first device to a first financial institution; second terminal means for linking the second device to a second financial institution; and third terminal means adapted to receive the first and second devices and to permit data transfer between them, so that a credit value stored in the first device which corresponds to a debit from an account held at the first financial institution can be reduced by a desired amount and a corresponding credit value can be recorded in the second device, the second device being adapted to transfer the credit value stored therein to an account held at the second financial institution.

Preferably, the first and second devices each store at least a portion of a program which is run in a synchronised interactive manner between the first and second devices.

The first and second portable data storage and processing devices are preferably "smart cards" comprising electronic data storage and processing circuitry on a credit card-like substrate, operating under the control of stored software.

The first and second terminal means are preferably adapted to link the respective smart cards to the respective financial institutions via a digital or analogue data network.

The third terminal means is preferably a card reader device adapted to receive both smart cards and to allow data transfer therebetween.

Preferably, the card reader device operates under the control of a stored program which facilitates the interaction of the first and second smart cards.

BRIEF DESCRIPTION OF THE DRAWINGS

FIGS. 4 to 7 illustrate schematically several different operations possible with the system of FIG. 1.

DESCRIPTION OF AN EMBODIMENT

Figure 1:
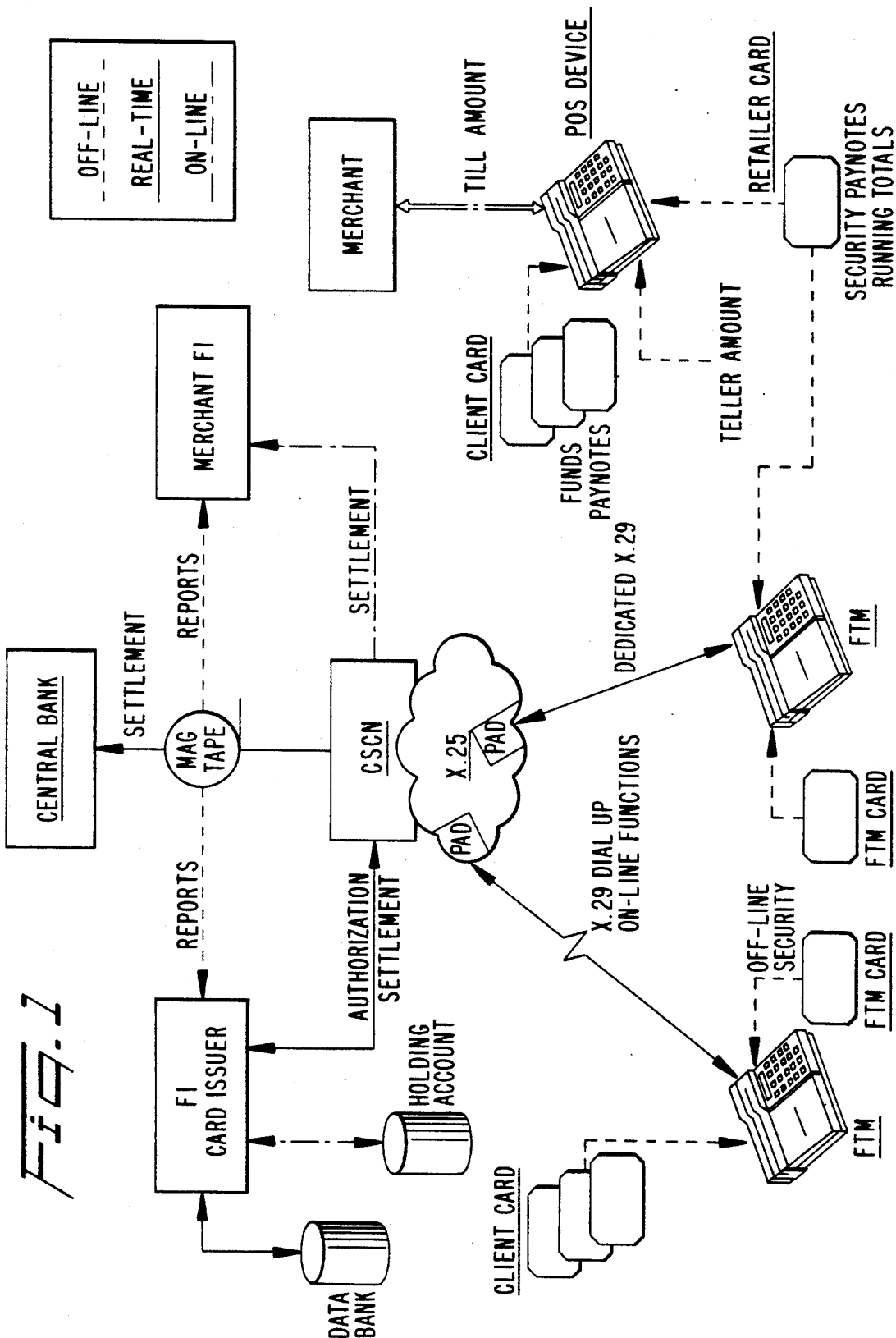
FIG. 1 is a schematic illustration of a funds transfer system according to the invention.

The funds transfer system illustrated schematically in the drawings is designed to allow the direct transfer of funds from a first financial institution to a cardholder, from the cardholder to a retailer, and from the retailer to a second financial institution, via an analogue or digital data network. In order to allow the necessary data to be transferred in a convenient manner, use is made of "smart cards". Such devices are well known and comprise a credit card-like substrate on which is mounted an integrated circuit containing a central processing unit (CPU) and associated random access memory (RAM) and read-only memory (ROM), as well as an electrically erasable programmable read-only memory (EEPROM). Contacts on the surface of the substrate allow a suitable card reader device to apply power to the computer on the card and permit data transfer to and from the computer.

Figure 2:
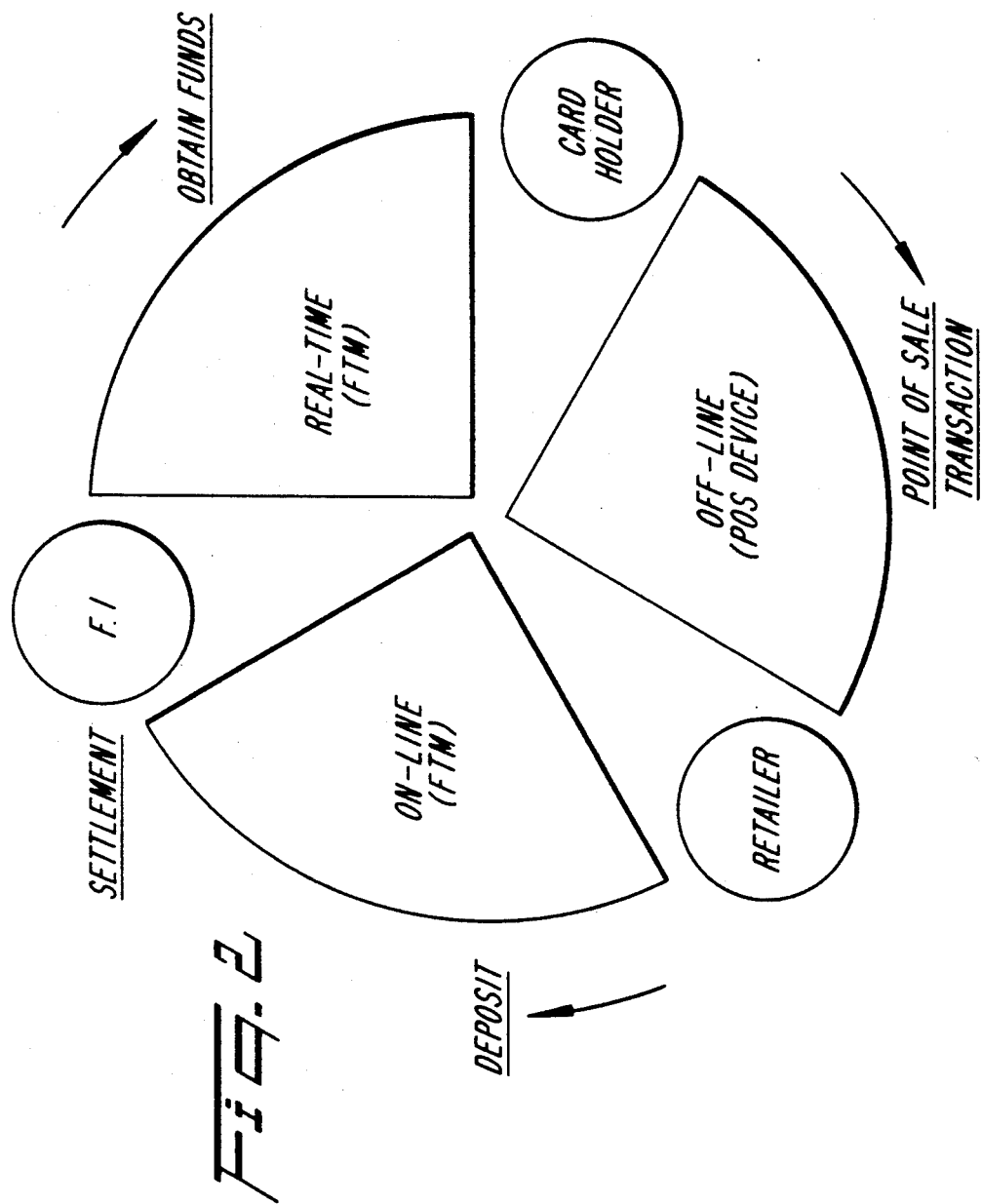
FIG. 2 is a schematic illustration of a basic mode of operation of the system of FIG. 1.

The operation of the system is illustrated in a highly simplified form in the diagram of FIG. 2. In the first leg of the process, a card holder obtains funds from an account held at a financial institution (FI). This is carried out in real time or on-line via a funds transfer machine (FTM) which is linked to the financial institution via the data network. The cardholder selects an amount to be credited to his personalised smart card (referred to hereinafter as a client card), and a credit balance on his client card is increased, while the balance in his account at the financial institution is debited correspondingly.

The cardholder can now use his client card to conduct financial transactions of different kinds, in either an on-line or an off-line manner. Typically, as shown in FIG. 2, the client card will be used by the cardholder in a transaction in which goods are purchased from a retailer. The retailer is provided with a point of sale (POS) device which is a self-contained, battery powered smart card reading device. To conduct a transaction, both the client card and a personalised smart card of the retailer (hereinafter called a retailer card) are both inserted into the POS device, which operates under the control of a stored program to allow communication between the client card and the retailer card. The amount of the transaction is entered into the POS device. This amount is then presented to the client card, which reduces the credit value stored in its EEPROM by the amount of the transaction, and forwards this amount to the retailer card which increases a credit value stored therein by the same amount.

Once the transaction is completed, the client card of the cardholder is removed from the POS device while the retailer card remains in the device. The retailer will typically conduct a number of different transactions with different cardholders during the course of a business day, and an accumulating total credit value will be stored in the retailer card. At intervals, typically at the end of each working day, the retailer will remove the retailer card from the POS device and insert it into a dedicated funds transfer machine (FTM) which is linked to a second financial institution (that is, the financial institution at which the retailer holds an account) via the electronic data network. The transaction information stored on the retailer card is transferred to the retailer's financial institution, which identifies the accounts of the various cardholders who have conducted transactions with the retailer, and which then credits the retailer's account with the total value of the transactions, and debits the financial institution's cardholder account with the value of the respective transaction. A magnetic tape record of the data transmissions conducted over the data network allows the respective financial institutions to generate printed statements for the cardholders and the retailer, if necessary. The cardholder can also use his card in an on-line manner, via an on-line funds transfer machine, to settle accounts, credit his card with a salary payment or another deposited amount, or conduct similar on-line transactions.

The advantage of an electronic funds transfer system of the kind described above in broad terms is that both conventional currency, such as cash or cheques, and conventional credit transactions, such as those employing credit cards, can be replaced. Delays in processing financial transactions are reduced or eliminated, while the use of cards on which a credit balance is stored ensures the availability of funds and reduces the risks associated with cash or credit transactions. Numerous other benefits arise from the use of an electronic data network, allowing a reduction in record-keeping and administration and reducing the likelihood of errors.

The operation of the funds transfer system will now be described in greater detail. A crucial part of the system is a card reader device which is adapted to receive two smart cards simultaneously, and effectively to allow communication between the cards. The card reader device is essentially conventional except for the provision of a second card reader slot and associated input/output circuitry. A suitable device is a type P500 terminal manufactured by Crouzet Sextant Avionique of France.

Figure 3:
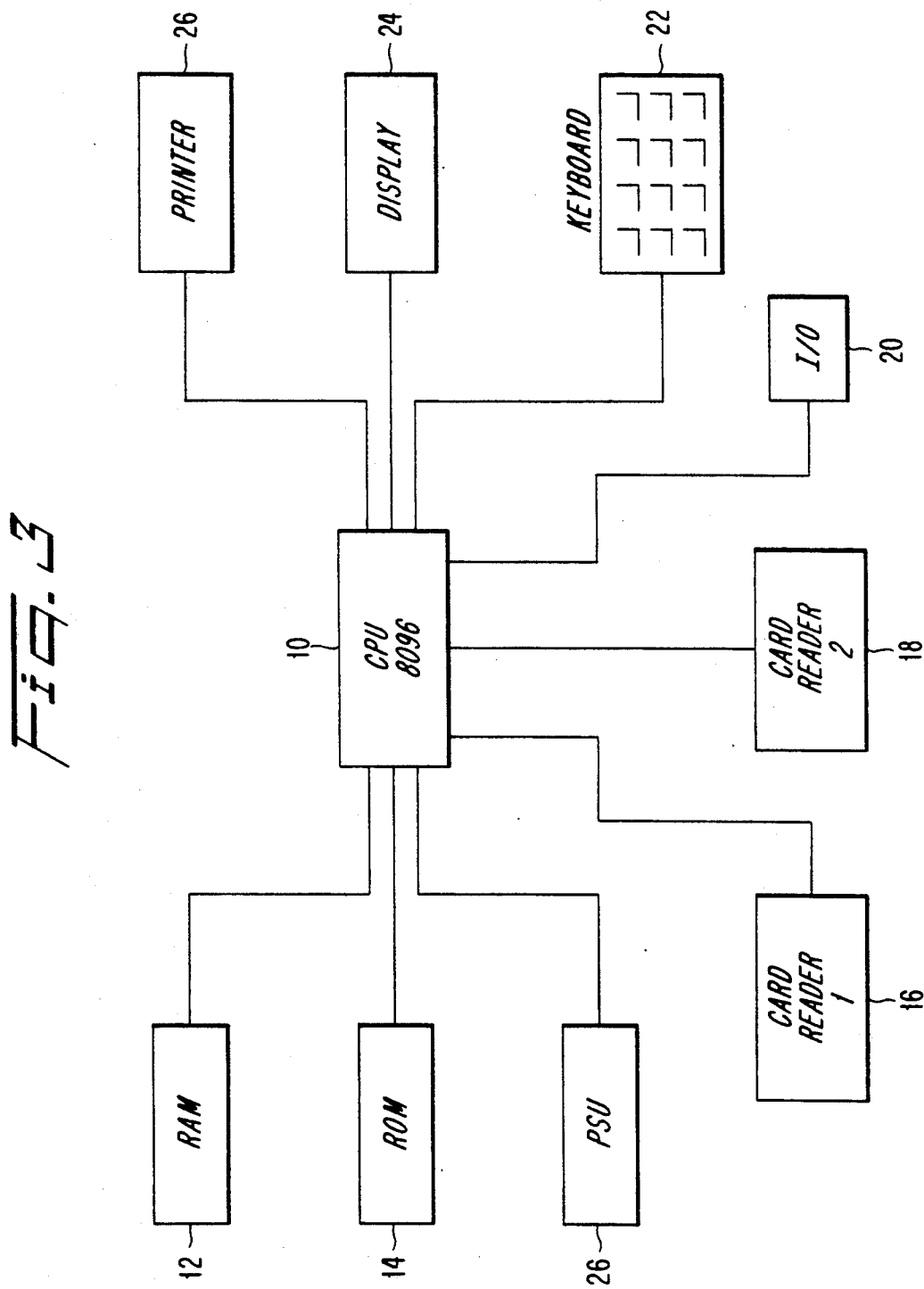
FIG. 3 is a basic schematic block diagram of a card reader device used in the system of FIG. 1.
Figure 4:
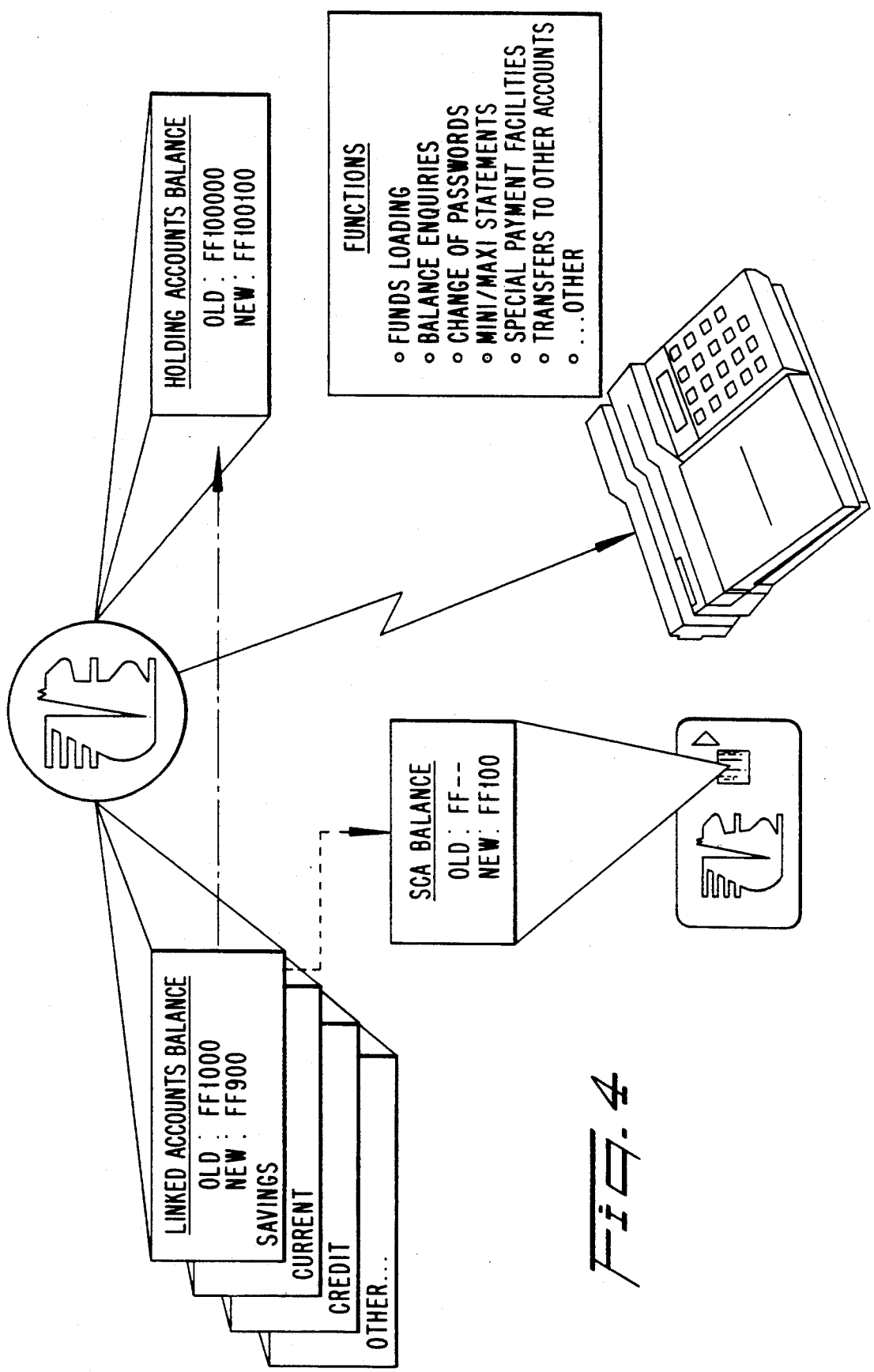
Figure 5:
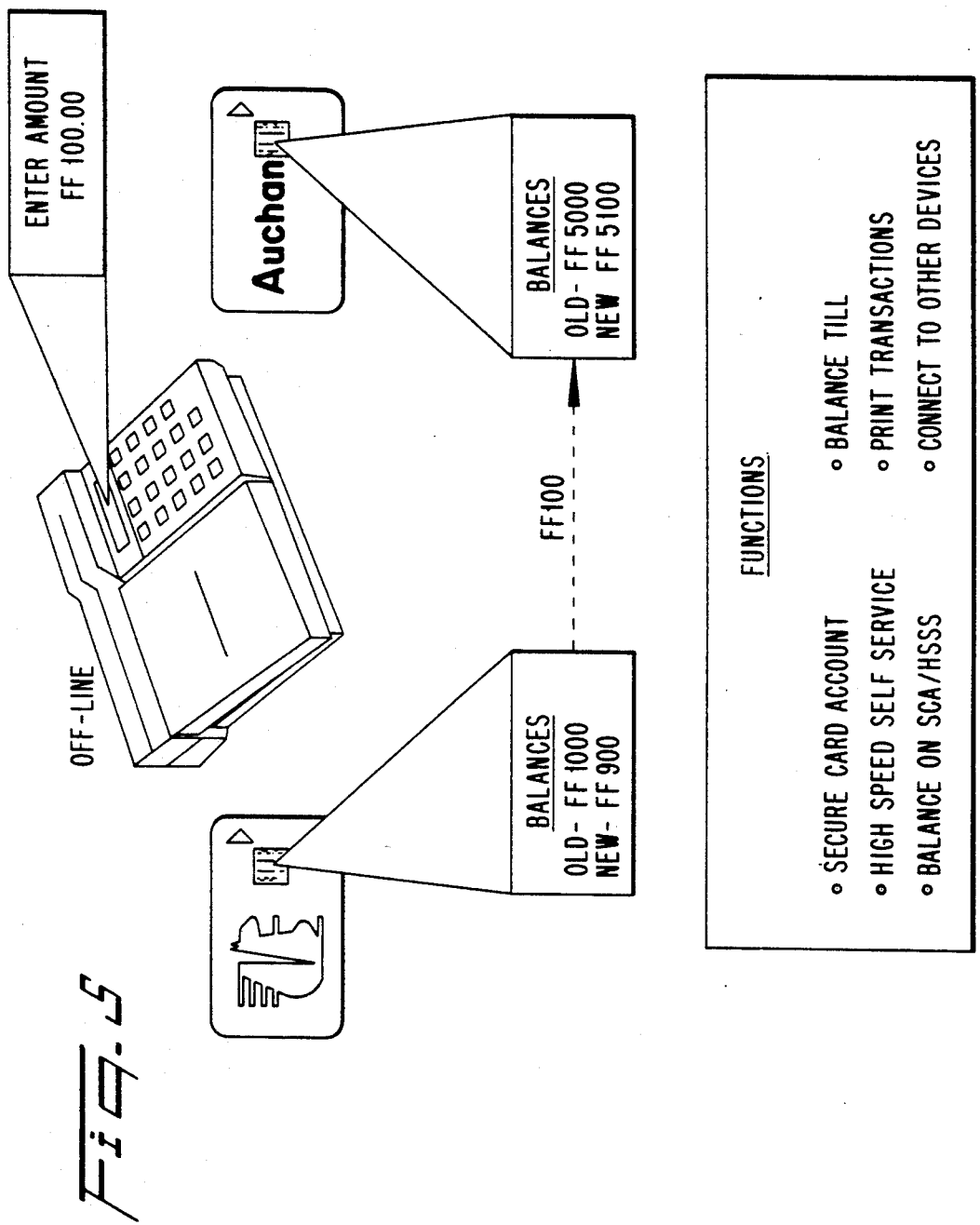
Figure 6:
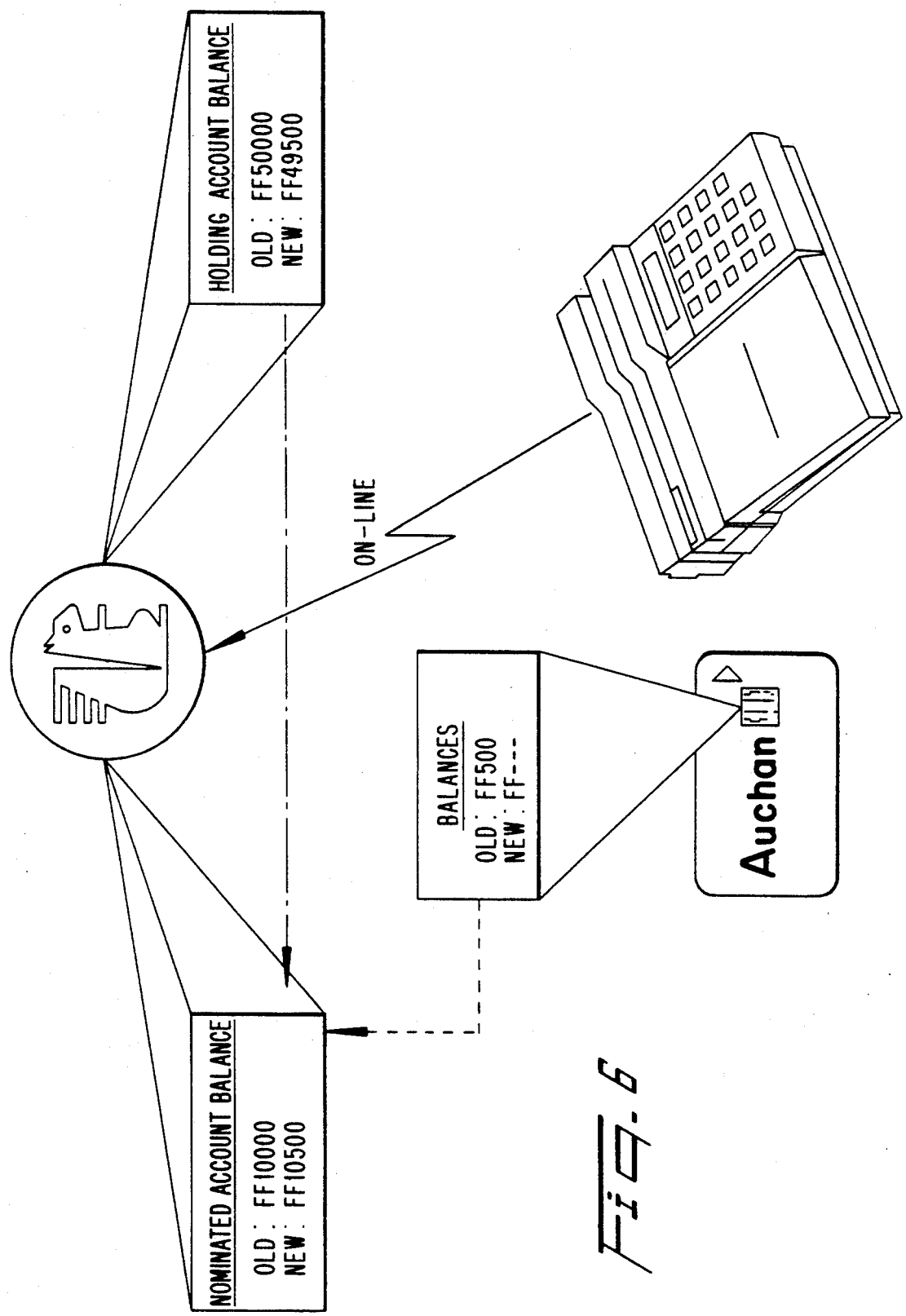

The circuitry of the card reader device is illustrated schematically in FIG. 3, and is based around an Intel type 8096 microprocessor 10. Associated with the microprocessor 10 is a random access memory (RAM) 12 and a read-only memory (ROM) 14. First and second smart card readers 16 and 18 and an input/output (I/O) interface 20 comprising an RS232 interface are connected to the microprocessor 10. Finally, a keypad 22, a liquid crystal display (LCD) 24 and a miniaturised paper printer 26 are also controlled by the microprocessor 10. The device is powered by a power supply circuit 28 comprising a rechargeable battery pack which allows the card reader to be operated for up to 30 days before replacement or recharging of the battery is necessary.

A boot program is stored in the ROM 14, which initialises the card reader when it is turned on. An operating system and software controlling the operation of the card reader is downloaded into the RAM 12 via the I/O interface 20, and must be reloaded if power is removed from the device.

The above described card reader device is used as a stand-alone point of sale (POS) device allowing communication between the client cart of a cardholder and the retailer card of the retailer. An essentially similar machine is used as a funds transfer machine (FTM) to allow communication between the client card and the cardholders financial institution, and to allow communication between the retailer card and the retailers financial institution. In this case however a modem is included in the device to link it to the electronic data network and thus to the respective financial institutions. In either case, the stored computer program in the RAM controls the operation of the device and generates prompts and other information which is displayed on the liquid crystal display 24 in use.

The first leg of a typical sequence of transactions will now be described, in which a cardholder transfers funds from an account held at his financial institution to his own client card. This is done using a card reader device as described above, configured as a funds transfer machine (FTM). Using the keypad 22, the cardholder selects a "Funds transfer" option and enters the amount to be transferred and the type of account to be debited. A display is generated on the liquid crystal display 24, prompting the cardholder to enter his card into the card reader device. Power is now applied to the card reader in the device, which applies power to the circuitry on the card itself. The microprocessor on the card initialises itself and outputs data to the card reader device indicating its operating parameters, including the baud rates, clock speed and data format which it uses. The card also outputs an identification code to the card reader device, indicating that it is a client card of the correct type.

Once the handshaking procedure between the client card and the FTM control card (as described in Appendices 1 and 2) is completed correctly, the transaction can continue. The cardholder is prompted to enter a password, which is checked with a corresponding code stored in a secure memory area on the card. If the correct password is not entered within three attempts, the card is disabled. Assuming that the correct password is entered, a file information table in the card memory is read, providing details, inter alia, of the current credit balance stored in the card.

The FTM now compiles a message for transmission via the data network, which includes critical fields such as the amount to be transferred, a transaction sequence number (TSN) and a unique sequence number (USN). The message is transmitted via the data network to the financial institution at which the cardholder holds an account. Assuming that there are sufficient funds in the cardholder's account to meet the request, the financial institution debits the cardholder's account and moves the funds to a holding account. The amount of the transfer, together with the TSN and the USN, is encrypted under the issuer key of the financial institution and transmitted back to the data network, which encrypts this encrypted data further with a data network key. The database of the data network is also updated with details of the transaction.

The message is routed back to the FTM, which extracts the encrypted portion of the data and transmits it, together with the date and account type, to the client card. The client card decrypts the encrypted data using the random key and the issuer key (both of which are stored securely on the card) and will check that the TSN and the USN in the decrypted data match the original TSN and USN. Assuming that a match occurs, the transaction is then written to the client card transaction file, and the current credit balance is updated on the card.

The FTM now runs a utility program on the client card which sends an 8 byte encrypted message to the FTM containing the TSN, the USN, and a code indicating whether the transaction was good or bad. The TSN stored in the card is incremented. The above data is encrypted with the data network key and is transmitted via the network to the financial institution for confirmation of the transaction. The display of the FTM now prompts the cardholder to remove his client card.

The result of the above transaction is that an amount of funds corresponding to the figure entered by the cardholder into the FTM is deducted from the credit balance of his account at the financial institution and transferred to a holding account of the financial institution. The credit balance stored on the client card is updated by the same amount, and can now be used to conduct further transactions. A state table of the above described transaction is shown in Appendix 1.

The above described transaction takes place between the financial institution and a so-called secure card account (SCA) which can only be accessed via a high security encryption/decryption procedure. The client card also makes provision for a high speed self service (HSSS) account which is limited to a relatively low maximum credit balance and which does not require the use of a password to be debited. This account can be used, for example, when using vending machines or the like, where relatively small amounts are involved. A state table showing how funds are transferred from the secure card account (SCA) to the high speed self service (HSSS) account is shown in Appendix 2.

Assuming now that cardholder wishes to conduct a transaction with a retailer, such as the purchase of goods or services, the card reader terminal illustrated in FIG. 3 is used, configured as a point of sale (POS) device. When this device is turned on by the retailer, the display prompts the retailer to enter the retailer card into the appropriate slot at the bottom of the machine. The card outputs its identity code to the device, which verifies that it is a retailer card, and a handshaking procedure is carried out as described above with reference to the funds transfer machine.

The retailer card has a merchant information file which stores, inter alia, the merchant's name, a "hot card" file and transaction batch numbers. The main menu of the software stored in the terminal is now displayed, and offers a choice of "Sales" or "Utilities". Assuming that "Sales" is selected, a second menu appears, offering a choice of "Purchase" or "Card balance". The latter option allows the retailer to check the running total credit balance stored in his card.

Assuming that the "Purchase" option is selected, the display will then prompt the retailer to enter the amount of the transaction. This can be done directly via the keypad 22, or via the input/output interface 20, if the card reader terminal is connected to a till. The display now prompts the cardholder to enter his client card into the second card reader, and a handshaking procedure once again takes place to ensure that the correct type of card is being used.

The sequence of events is described in the state table of Appendix 3, and includes the generation of a random key by the client card which is then used in the subsequent messages for this transaction. The retailer card checks to see whether the credit balance stored thereon is below the permissable maximum and that the amount of the transaction will not cause the balance to exceed the maximum. Information from the client card is now read into the RAM 12 of the terminal, including the client identification code and balance information. Once the security measures (up to and including Utility 4 in Appendix 3) have been carried out, the terminal prompts the card holder to indicate whether a secure card account (SCA) transaction or a high speed self service (HSSS) transaction is desired. The terminal now runs a utility to check whether the client card is on the "hot card" list stored on the retailer card, and if so, aborts the transaction, and switches off the client card.

The terminal now prompts the cardholder to enter his password. If the correct password is recognised, a flag is set in the RAM of the card. The amount of the transaction, the date, the retailer identity, and the transaction batch number are now transferred directly to the client card in an unencrypted form. The microprocessor of the client card checks that the flag in the RAM is correctly set to indicate the use of the correct password, and checks the identity of the retailer card to ensure that it is in fact a retailer card. The transaction information is then stored in the RAM of the card. The transaction information is now written to the transaction file on the client card and the balance in the client card is updated (that is, reduced) and stored in a non volatile memory area of the card. If the amount of the transaction is greater than the stored balance (that is, an impermissible transaction) the card is put into a CPU loop so that it "hangs", and cannot be reset except by aborting the transaction. Once the transaction has been encrypted and recorded, the RAM of the card is cleared.

The terminal now transmits the encrypted transaction information to the retailer card, and the cardholder's identification number and the record sequence number are checked, both to ensure a valid transaction and to ensure correct decryption. The accumulated credit balance on the retailer card is now updated. Similarly to the client card, the card will "hang" if the total balance exceeds the maximum permissible limit. The amount of the transaction, the client card unique sequence number (USN), and the financial institution issuer code are now encrypted with the key of the data network, and this information is stored in a non volatile area on the retailer card. The total number of SCA transactions is incremented, and the transaction information is written to the retailer card transaction file. This information is further encrypted with the card reader terminal key, as contained on the retailer card.

The encrypted information is now transferred to the RAM 12 of the card reader terminal, and a transaction record is printed using the printer 26. On the same record, an encrypted record of the transaction is printed, in a 16 byte format, to ensure, if necessary, that the retailer has not modified the POS device software. The cardholder is now prompted to remove his card, and the original main menu is displayed.

The result of the above transaction is that the credit balance on the client card is reduced by the amount of the transaction, and the accumulated credit balance on the retailer card is increased correspondingly. The printed transaction record, including its encrypted data, allows errors to be traced. The entire transaction takes place on an off-line basis, using only the two smart cards (the client card and the retailer card) and the stand-alone card reader terminal.

In the case of a high speed self service (HSSS) transaction, a simplified procedure is followed. A state table of such a transaction is shown in Appendix 4.

The next step in the operation of the system is for the retailer to settle the transactions, whether SCA or HSSS transactions, recorded on his retailer card. The settlement procedure is once again an on-line procedure, requiring the use of a funds transfer machine (FTM). This may be a dedicated device located on the premises of the retailer, or may be located elsewhere.

Using the keypad of the FTM, the retailer chooses the "settlement" option, and is prompted via the display to insert his card. The FTM then conducts the usual handshaking procedure between the FTM card inserted into the machine and the retailer card. A utility on the retailer card is now run which outputs the batch total, date, batch number, number of transactions and the retailer card USN, all encrypted under the data network key. This data is then transmitted to the data network through the pre-initialised communications link, typically a XXX pad. Transactions which are encrypted using the data network key are sent to the data network on a one to one basis, and are confirmed by the network. The network decrypts the received data and conducts a number of validity checks, for example, by checking the sum of all transaction amounts against the total in the batch data.

The batch number and the new batch data are now encrypted by the data network with the data network key, and transmitted back to the FTM. The FTM transfers this data to the retailer card, and the retailer card decrypts the data and checks that the batch numbers remain the same. The retailer card then increments the batch number and updates it, enters the batch date, and resets all totals to zero. The transaction address on the file information table (FIT) on the card is reset to the first address position, and a bit flag is set which allows the transaction file to be overwritten by the data network hot card file. A utility is then run to write the hot card file to the transaction file. Finally, the FTM prompts the retailer to remove the retailer card. The batch transaction data is transmitted via the data transfer network to the financial institution of the retailer, updating the retailer's account by crediting it with the total value of the transactions. The network also sends a message to the financial institution of each cardholder who conducted a transaction in the particular batch concerned, authorising a transfer of funds from the holding account of the cardholder's financial institution to the retailer's financial institution. A state table illustrating the above settlement procedure appears in Appendix 5.

It will be apparent from the above description that the entire chain of financial transactions is accomplished by the direct transfer of information between the financial institutions concerned and the client and retailer smart cards. By the use of high levels of encryption, a high security level is achieved. This is made possible mainly by the use of intelligent cards which can communicate with one another, via an intelligent terminal device, which permits the necessary high standard of encryption/decryption and other security procedures to be achieved. Diagrams illustrating the various transactions are shown in FIGS. 4 to 7.

An important aspect of the invention is the running of a program (application) which is effectively split between the two (or more) CPU's of the smart cards. The running of these CPU's is facilitated and synchronised by the card reader terminal, which itself runs a stored program. However, the transaction is controlled by the programs stored on the cards themselves, while the terminal merely allows direct communication between the cards, consistent with the operating protocol of the cards.

Although the funds transfer system of the invention has be described in relation to a conventional, typical series of transactions, it will be appreciated that the applicability of the system is wider than the specific example given above. The described system can be used to operate savings, transmission and current accounts, as well as credit accounts (including general credit accounts and specific credit accounts such as petrol or garage type accounts). The system is also applicable to the running of mortage bond accounts, subscription deposit accounts, or foreign exchange accounts, for example.

APPENDIX 1

| Client (Utility) | FTM (Control) |
|---|---|
| UTIL_1: | |
| Function: Generate random number. Encrypt random number, card type and currency with transaction key. | |
| Output. | |
| Dependencies: None | |

APPENDIX 1-continued

| Client (Utility) | FTM (Control) |
|---|---|
| | UTIL_2:<br>Function: Input. Decrypt with transaction key. Encrypt random number and card type with random key.<br>Dependencies: Utility card must be client card.<br>UTIL_3:<br>Function: Output.<br>Dependencies: None. |
| UTIL_2:<br>Function: Input. Decrypt with random key.<br>Dependencies: Random number must match random number generated in UTIL_1.<br>UTIL_9:<br>Function: Input. Decrypt with Metrolink key and issuer key. Write transaction. Update balance. Clear RAM.<br>Dependencies: Control card presented in UTIL_2 must be FTM card.<br>Password must have been presented.<br>Client transaction sequence numbers must match.<br>Transactions amount cannot overflow SCA balance. | |

APPENDIX 2

| Client (Utility) | FTM (Control) |
|---|---|
| UTIL_1:<br>Function: Generate random number. Encrypt random number, card type and currency with transaction key. Output.<br>Dependencies: None | |
| | UTIL_2:<br>Function: Input. Decrypt with transaction key. Encrypt random number and card type with random key.<br>Dependencies: Utility card must be client card.<br>UTIL_3:<br>Function: Output.<br>Dependencies: None. |
| UTIL_2:<br>Function: Input. Decrypt with random key.<br>Dependencies: Random number must match random number generated in UTIL_1.<br>UTIL_7:<br>Function: Input. Write transaction. Update balances. Clear RAM.<br>Dependencies: Control card presented in UTIL_2 must be FTM card.<br>Password must have been presented.<br>Transaction amount cannot be greater than SCA balance.<br>Transaction amount cannot overflow HSSS balance. | |

APPENDIX 3

| Client (Utility) | Retailer (Control) |
|---|---|
| UTIL_1:<br>Function: Generate random number. Encrypt random number, card type and currency with transaction key. Output.<br>Dependencies: None | |
| | UTIL_4:<br>Function: Input. Decrypt with transaction key. Encrypt random number, record sequence number & card type with random key.<br>Dependencies: Retailer card can not be full.<br>Utility card must be client card.<br>Currencies must match.<br>UTIL_5:<br>Function: Output.<br>Dependencies: None. |
| UTIL_2:<br>Function: Input. Decrypt with random key.<br>Dependencies: Random number must match random number generated in UTIL_1.<br>UTIL_4:<br>Function: Input. Handle information.<br>Dependencies: Password must have been presented. | |

APPENDIX 3-continued

| Client (Utility) | Retailer (Control) |
|---|---|
| Control card presented in UTIL_2 must be retailer card.<br>UTIL_6:<br>Function: Write transaction. Update balance. Encrypt amount, client card unique sequence number and record sequence number with random key. Output. Clear RAM.<br>Dependencies: Paynote amount presented to card in UTIL_4 must be greater than zero.<br>Paynote amount cannot be greater than SCA balance. | UTIL_6:<br>Function: Input. Decrypt with random key. Update balance. Write transaction. Encrypt amount, client card unique sequence number and issuer code with metrolink 1 key.<br>Dependencies: Utility card presented in UTIL_4 must be client card.<br>Record sequence number must match.<br>Paynote amount cannot overflow batch total.<br>UTIL_5:<br>Function: Output.<br>Dependencies: None. |

APPENDIX 4

| Client (Utility) | Retailer (Control) |
|---|---|
| UTIL_1:<br>Function: Generate random number. Encrypt random number, card type and currency with transaction key. Output.<br>Dependencies: None | |
| | UTIL_4:<br>Function: Input. Decrypt with transaction key. Encrypt random number, record sequence number & card type with random key.<br>Dependencies: Retailer card can not be full.<br>Utility card must be client card.<br>Currencies must match.<br>UTIL_5:<br>Function: Output.<br>Dependencies: None. |
| UTIL_2:<br>Function: Input. Decrypt with random key.<br>Dependencies: Random number must match random number generated in UTIL_1.<br>UTIL_4:<br>Function: Input. Handle information.<br>Dependencies: Control card presented in UTIL_2 must be retailer card.<br>UTIL_6:<br>Function: Write transaction. Update balance. Encrypt amount, client card unique sequence number and record sequence number with random key. Output.<br>Dependencies: Paynote amount presented to card in UTIL_4 must be greater than zero.<br>Paynote amount cannot be greater than HSSS balance. | |
| | UTIL_6:<br>Function: Input. Decrypt with random key. Update balance. Write transaction. Encrypt amount, client card unique sequence number and issuer code with metrolink 1 key.<br>Dependencies: Utility card presented in UTIL_4 must be client card.<br>Record sequence number must match.<br>Paynote amount cannot overflow batch total.<br>UTIL_5:<br>Function: Output.<br>Dependencies: None. |

APPENDIX 5

| Retailer (Utility) | FTM (Control) |
|---|---|
| | UTIL_1:<br>Function: Generate random number. Encrypt random number and card type with transaction key. Output. |

APPENDIX 5-continued

| Retailer (Utility) | FTM (Control) |
|---|---|
| UTIL_1:<br>Function: Input. Decrypt with transaction key.<br>Dependencies: None.<br>UTIL_2:<br>Function: Encrypt batch number, batch total and batch date with metrolink key. Encrypt batch number, retailer card unique sequence number & total number of transactions with metrolink key. Output.<br>Dependencies: Control card presented in UTIL_1 must be FTM card.<br>UTIL_3:<br>Function: Input. Decrypt with metrolink key. Reset batch.<br>Dependencies: Batch number must match batch number encrypted in UTIL_2. | Dependencies: None. |

We claim:

1. A method of transferring funds including the steps of:
   linking a first portable data storage and processing device to a first financial institution, the first portable data storage device storing at least a portion of a program;
   debiting an account held at the financial institution and recording a corresponding credit value in the first portable data storage and processing device;
   linking the first portable data storage device to a second, similar device via a terminal means, the second portable data storage device storing at least a portion of a program which is run in a synchronized, interactive manner with the portion of the program stored in the first portable data storage device;
   reducing the credit value in the first device and recording a corresponding credit value in the second device;
   linking the second portable data storage and processing device to a second financial institution;
   reducing the credit value in the second device;
   and recording a corresponding credit value in an account held at the second financial institution.

2. A method according to claim 1 wherein the terminal means receives the first and second devices and permits data transfer therebetween, the terminal means operating under the control of a stored program to facilitate interaction of the first and second devices.

3. A method according to claim 1 wherein the first and second financial institutions are one and the same bank, building society or another similar institution.

4. A method according to claim 1 wherein the first and second financial institutions are different banks, building societies or other similar financial institutions.

5. A method according to claim 1 wherein the first and second portable data storage and processing devices are "smart cards" comprising electronic data storage and processing circuitry on a credit card-like substrate, operating under the control of stored software.

6. A method according to claim 1 wherein the first device is allocated to an individual registered at the first financial institution, while the second device is allocated to a retailer or other commercial entity, the magnitude of the reduction in the credit value stored in the first device corresponding to the value of a transaction between the individual and the retailer or commerical entity.

7. A method according to claim 1 wherein the second device totals the credit values recorded therein, so that the credit value recorded at the second financial institution corresponds to the total of all credit values recorded in the second device in a predetermined period.

8. A system for transferring funds including:
   first and second portable data storage and processing devices, each storing at least a portion of a program which is run in a synchronized, interactive manner between the first and second devices;
   first terminal means for linking the first device to a first financial institution;
   second terminal means for linking the second device to a second financial institution;
   and third terminal means adapted to receive the first and second devices and to permit data transfer between them, so that a credit value stored in the first device which corresponds to a debit from an account held at the first financial institution can be reduced by a desired amount and a corresponding credit value can be recorded in the second device, the second device being adapted to transfer the credit value stored therein to an account held at the second financial institution.

9. A system according to claim 8 wherein the first and second portable data storage and processing devices are "smart cards" comprising electronic data storage and processing circuitry on a credit card-like substrate, operating under the control of stored software.

10. A system according to claim 9 wherein the first and second terminal means are adapted to link the respective smart cards to the respective financial institutions via a data network.

11. A system according to claim 9 wherein the third terminal means is a card reader device adapted to receive both smart cards and to allow data transfer therebetween.

12. A system according to claim 11 wherein the card reader device operates under the control of a stored program which facilitates the interaction of the first and second smart cards.

* * * * *